United States Patent [19]

Furukawa et al.

[11] 3,919,180

[45] Nov. 11, 1975

[54] METHOD OF PRODUCING ALTERNATING COPOLYMERS OF DONOR MONOMER AND ACCEPTOR MONOMER FROM NOT LESS THAN THREE MONOMERS

[75] Inventors: Junji Furukawa, Kyoto; Yutaka Iseda; Kazuo Haga, both of Uji; Koichi Irako, Kodaira, all of Japan

[73] Assignee: Bridgestone Tire Company Limited, Tokyo, Japan

[22] Filed: Aug. 17, 1973

[21] Appl. No.: 389,185

Related U.S. Application Data

[63] Continuation of Ser. No. 222,392, Jan. 31, 1972, abandoned, which is a continuation of Ser. No. 837,619, June 30, 1969, abandoned.

[30] Foreign Application Priority Data

July 3, 1968  Japan......................... 43-45840

[52] U.S. Cl........ 260/80.7; 252/429 B; 252/431 R; 260/30.4 A; 260/32.6 A; 260/33.6 UA; 260/82.5
[51] Int. Cl.²..... C08F 4/12; C08F 4/16; C08F 4/20; C08F 4/52
[58] Field of Search.............................. 260/80.7

[56] References Cited
UNITED STATES PATENTS

| | | | |
|---|---|---|---|
| 2,537,626 | 1/1951 | Eberly et al. | 260/80.5 |
| 2,601,016 | 6/1952 | Hendricks et al. | 117/132 |
| 2,854,439 | 9/1958 | Slocombe | 260/80.7 |
| 3,070,587 | 12/1962 | Zelinski | 260/943 |
| 3,165,503 | 1/1965 | Kahn et al. | 260/943 |
| 3,423,377 | 1/1969 | Tennenhouse | 260/80.7 |
| 3,426,005 | 2/1969 | Serniuk | 260/80.7 |
| 3,514,431 | 5/1970 | Izawa | 260/80.7 |

*Primary Examiner*—Stanford M. Levin
*Attorney, Agent, or Firm*—Stevens, Davis, Miller & Mosher

[57] ABSTRACT

Multi-component alternating copolymers having a ratio of the total moles of donor monomer units of conjugated dienes, aryl-substituted ethylenically unsaturated hydrocarbons or ethylenically unsaturated hydrocarbons to the total moles of acceptor monomer units of acrylonitrile, methacrylonitrile or esters of $\alpha,\beta$-unsaturated carboxylic acids being substantially 1 : 1, said donor monomer units and said acceptor monomer units being bonded alternately are produced by copolymerizing a monomer (a) of conjugated dienes having 4 to 10 carbon atoms, a conjugated polar ethylenically unsaturated monomer (b) of acrylonitrile, methacrylonitrile or esters of $\alpha,\beta$-unsaturated carboxylic acids and at least one monomer (c) of acrylonitrile, methacrylonitrile, esters of $\alpha,\beta$-unsaturated carboxylic acids, conjugated dienes aryl-substituted ethylenically unsaturated hydrocarbons or ethylenically unsaturated hydrocarbons, said monomer (c) being different from the monomers (a) and (b), at a temperature of $-100°C$ to $100°C$ in liquid state, in the presence of a catalyst prepared from a component (A): at least one transition metal compound selected from compounds of transition metals of the Groups IV and V in the Periodic Table and a component (B): an aluminum-containing component selected from the group consisting of aluminum compounds having the general formulae

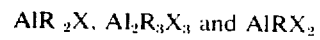

$AlR_2X$, $Al_2R_3X_3$ and $AlRX_2$ and a combination of two or more aluminum compounds having the general formulae

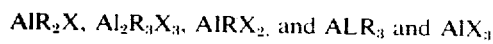

$AlR_2X$, $Al_2R_3X_3$, $AlRX_2$, and $AlR_3$ and $AlX_3$ wherein R represents a hydrocarbon radical selected from the group consisting of alkyl, cycloalkyl, aryl, alkaryl, aralkyl radicals having 1 to 20 carbon atoms and X represents a halogen radical selected from the group consisting of F, Cl, Br, and I radicals. At least one of components (A) and (B) being complexed with a basic organic compound which is an organic nitrile, an $\alpha,\beta$-unsaturated carboxylic acid ester, a benzoic acid ester, an aryl tertiary amine, an aryl alkyl tertiary amine or thiophene.

22 Claims, 4 Drawing Figures

METHOD OF PRODUCING ALTERNATING COPOLYMERS OF DONOR MONOMER AND ACCEPTOR MONOMER FROM NOT LESS THAN THREE MONOMERS

This is a continuation, of application Ser. No. 222,392, filed Jan. 31, 1972, which is a continuation of Ser. No. 837,619 filed 6/30/69 both now abandoned.

The present invention relates to a method of producing multi-component alternating copolymers wherein a ratio of the total moles of donor monomer units selected from the group consisting of conjugated dienes, aryl-substituted ethylenically unsaturated hydrocarbons and ethylenically unsaturated hydrocarbons to the total moles of acceptor monomer units selected from the group consisting of acrylonitrile, methacrylonitrile and esters of $\alpha,\beta$-unsaturated carboxylic acids is substantially 1 : 1 and the donor monomer units and the acceptor monomer units are bonded alternately.

The present invention consists in a method of producing multi-component alternating copolymers containing particularly selected conjugated dienes and particularly selected conjugated polar ethylenically unsaturated monomers by using a catalyst consisting of a transition metal compound and an organoaluminum halide.

Many multi-component copolymers containing a conjugated diene and a conjugated polar ethylenically unsaturated monomer have become important industrially. A well known method of producing these multi-component copolymers comprises using a free radical initiator to obtain random or graft copolymers. These copolymers have an irregular arrangement of the monomer units and the composition of the copolymers varies according to the combination of monomers and the feed ratio.

The inventors have already disclosed in U.S. Pat. application Ser. No. 740,342 and now abandoned, a method of producing alternating copolymers of a conjugated diene and a conjugated polar ethylenically unsaturated monomer by using a catalyst prepared from a metal compound selected from compounds of transition metals of the Groups IV and V in the Periodic Table and an organoaluminum halide. By this method it is possible to obtain an alternating copolymer which has never been obtained by the conventional method using a free radical initiator.

The inventors have made further studies and as the result have found that even if in the method disclosed in the above patent application the conjugated diene is replaced with a combination of at least two conjugated dienes, a combination of a conjugated diene and an ethylenically unsaturated hydrocarbon, a combination of a conjugated diene, an aryl-substituted ethylenically unsaturated hydrocarbon or a combination of these combinations, or the conjugated polar ethylenically unsaturated monomer is replaced with a combination of acrylonitrile and methacrylonitrile, a combination of one of these monomers and an ester of $\alpha,\beta$-unsaturated carboxylic acid, a combination of at least two esters of $\alpha,\beta$-unsaturated carboxylic acids or a combination of these combinations, the similar alternating copolymers can be obtained and further that the catalyst components (A) and (B) are effective within the range described in the present invention, and the present invention has been accomplished. According to the method of the present invention, it is possible to obtain multi-component alternating copolymers wherein the conjugated diene units are connected in a high trans-1,4 type. Furthermore, since the ratio of the total mole of the donor monomer units to the total mole of the acceptor monomer units is substantially 1 : 1, even if the feed ratio of the monomer is varied, it is considered that the donor monomer units and the acceptor monomer units are bonded substantially alternately.

Furthermore, it has been found that the property of binary alternating copolymer can be further improved by producing the multi-component alternating copolymers. The unexpected remarkable effect can be observed in, for example, butadiene-acrylonitrile-n-butyl acrylate alternating copolymer. In general, the nitrile rubber containing a high nitrile content has a relatively high glass transition temperature ($T_g$) and there was a problem in the physical properties at low temperature. The inventors had succeeded in making the glass transition temperature more lower than that of a random polymer having the equivalent nitrile content by forming butadiene-acrylonitrile alternating copolymer but the object has not been satisfied fully. The inventors have succeeded in decreasing the glass transition temperature more broadly and improving the physical properties at low temperature by adding n-butyl acrylate to the polymerization system to form the multi-component alternating copolymer. The relation of the composition to the glass transition temperature ($T_g$) is shown in the following Table.

| | Composition | | | $T_g(°C)$ |
|---|---|---|---|---|
| | Donor monomer Butadiene | Acceptor Acrylonitrile | monomer n-butyl acrylate | |
| Comparative Example | 50.1 | 49.9 | — | −14 |
| Example 1 | 52.8 | 38.6 | 8.6 | −22 |
| Example 2 | 50.7 | 28.2 | 21.1 | −47 |

Such method of producing multi-component alternating copolymers cannot be anticipated from the conventional technic and further these multi-component alternating copolymers have never been known.

The first aspect of the present invention consists in a method of producing multi-component alternating copolymers having a ratio of the total moles of donor monomer units selected from the group consisting of conjugated dienes, aryl-substituted ethylenically unsaturated hydrocarbons and ethylenically unsaturated hydrocarbons to the total moles of acceptor monomer units selected from the group consisting of acrylonitrile, methacrylonitrile and esters of $\alpha,\beta$-unsaturated carboxylic acids being substantially 1 : 1, said donor monomer units and said acceptor monomer units being bonded alternately, which comprises copolymerizing a monomer (a) selected from the group consisting of conjugated dienes having 4 to 10 carbon atoms, a conjugated polar ethylenically unsaturated monomer (b) selected from the group consisting of acrylonitrile, methacrylonitrile and esters of $\alpha,\beta$-unsaturated carboxylic acids and at least one monomer (c) selected from the group consisting of acrylonitrile, methacrylonitrile, esters of $\alpha,\beta$-unsaturated carboxylic acids, conjugated dienes aryl-substituted ethylenically unsaturated hydrocarbons and ethylenically unsaturated hydrocarbons, said monomer (c) being different from the monomers (a) and (b), at a temperature of −100°C to 100°C in liquid state, in the presence of a catalyst prepared from a component (A): at least one transition metal compound selected from compounds of transition metals of the Groups IV and V in the Periodic Table and a component (B): an aluminum-containing component selected from the group consisting of aluminum compounds having the general formulae $$AlR_2X, Al_2R_3X_3 \text{ and } AlRX_2$$

and a combination of two or more aluminum compounds having the general formulae $$AlR_2X, Al_2R_3X_3, AlRX_2, AlR_3 \text{ and } AlX_3$$

wherein R represents a hydrocarbon radical selected from the group consisting of alkyl, cycloalkyl, aryl, alkaryl, aralkyl radicals having 1 to 20 carbon atoms and X represents a halogen radical selected from the group consisting of F, Cl, Br, and I radicals, in the above aluminum-containing component it being preferable that a ratio (d) of the total number of the hydrocarbon radicals to the total number of halogen radicals satisfies the following requirement $$0 < d \leq 2.0 \quad (1)$$

and R and X in the aluminum compounds constituting the component B may be same or different.

A second aspect of the present invention consists in a method of producing the above described multi-component alternating copolymers by using a catalyst, which is prepared from the above components (A) and (B) in the presence of a conjugated polar ethylenically unsaturated monomer.

A third aspect of the present invention consists in a method of producing the above multi-component alternating copolymers by using a catalyst, which is prepared from the above components (A) and (B), at least one of the components (A) and (B) having been complexed by a basic organic compound selected from the group consisting of organic nitriles, $\alpha,\beta$-unsaturated carboxylic acid esters, benzoic acid esters, aryl tertiary amines, aryl alkyl tertiary amines and thiophene.

A fourth aspect of the present invention consists in a method of producing the above multi-component alternating copolymers, in which the conjugated diene units are connected in a high trans-1,4 type.

The conjugated dienes (a) to be used in the present invention are ones having 4 to 10 carbon atoms and the typical examples are butadiene-1,3, isoprene, pentadiene-1,3, hexadiene-1,3, 2,3-dimethyl-butadiene-1,3, and phenyl-butadiene-1,3. Among them, butadiene-1,3 and isoprene and preferable.

The conjugated polar ethylenically unsaturated monomers (b) to be used in the present invention include acrylonitrile, methacrylonitrile and $\alpha,\beta$-unsaturated carboxylic acid ester, for example, methyl acrylate, ethyl acrylate, propyl acrylate, butyl acrylate, methyl methacrylate, ethyl methacrylate, acrylonitrile. Among them, methyl acrylate, methyl methacrylate and acrylonitrile are preferable.

The monomers (c) to be used in the present invention are ones different from (a) and (b) and include conjugated dienes, conjugated polar ethylenically unsaturated monomers, aryl-substituted ethylenically unsaturated hydrocarbons, ethylenically unsaturated hydrocarbons and combinations of two or more of these compounds. The typical examples are butadiene-1,3, isoprene, pentadiene-1,3, hexadiene-1,3, 2,3-dimethyl- butadiene-1,3, phenyl-butadiene-1,3, methyl acrylate, ethyl acrylate, propyl acrylate, butyl acrylate, methyl methacrylate, ethyl methacrylate, acrylonitrile, styrene, 1-vinylnaphthalene, 3-vinyltoluene, divinylbenzene, 3,5-diethylstyrene, $\alpha$-methylstyrene, propylene isobutylene, butene-1, ethylene and combinations of two or more of these compounds. Among them, butadiene-1,3, isoprene, methyl acrylate, methyl methacrylate acrylonitrile, styrene isobutylene and combinations of two or more of these compounds are preferable.

As combinations of monomers mention may be made of isoprene/acrylonitrile/butadiene, butadiene/acrylonitrile/n-butyl acrylate, butadiene/acrylonitrile/isobutylene, butadiene/acrylonitrile/styrene, butadiene/methyl methacrylate/styrene, butadiene/methyl methacrylate/acrylonitrile, pentadiene/acrylonitrile/butadiene, isoprene/methyl methacrylate/butadiene, isoprene/acrylonitrile isobutylene, butadiene/methyl acrylate/isobutylene, butadiene/acrylonitrile/styrene/isobutylene, butadiene/methyl acrylate/acrylonitrile/styrene, etc.

The proportion of the conjugated diene (a), the conjugated polar ethylenically unsaturated monomer (b), and the monomer (c) to be used for the copolymerization reaction may be selected optionally, but it is preferable that the ratio of the total sum of the donor monomers to that of the acceptor monomers in the total fed monomer is within a range of from 1 : 10 to 10 : 1 (molar ratio). The monomer feed ratio influences the yield, polymerization degree and composition of the resulting copolymer and the like, so that the monomer feed ratio can be properly determined depending upon the purpose.

Means for feeding the monomers is optional.

The catalytic component (A) to be used in the method of the present invention is at least one compound selected from the group consisting of compounds of the transition metals of Groups IV and V in the Periodic Table. Among them, compounds soluble in the mixed monomer solution are suitable, and particularly compounds of Group V soluble in the mixed monomer solution are most preferable.

The most preferable one is vanadium compound soluble in the mixed monomer solution.

As said catalytic component (A), mention may be made of vanadyl trichloride, vanadium tetrachloride, (tert-butoxy) vanadyl dichloride, (di-tert-butoxy) vanadyl chloride, (tri-tert-butoxy) vanadyl, (tri-methoxy) vanadyl, (tri-ethoxy) vanadyl, (tri-propoxy) vanadyl, (tri-iso-propoxy) vanadyl, (tri-butoxy) vanadyl, (tri-iso-butoxy) vanadyl, (tri-sec-butoxy) vanadyl, (tri-pentoxy) vanadyl, (tri-iso-pentoxy) vanadyl, (tri-hexoxy) vanadyl, (tri-2-ethyl-hexoxy) vanadyl, (tri-tolyloxy) vanadyl, (tri-phenoxy) vanadyl, (tri-cyclohexoxy) vanadyl, vanadyl diacetylacetonate, vanadium trisacetylacetonate, dichloride naphthenate, vanadyl acetate, vanadyl octenate, vanadyl oxalate, vanadocene dichloride, vanadyl tribromide, vanadium trichloride, tantalum pentachloride, tantalum pentaethoxide, tributoxy tantalum mdichloride, zirconium tetra-n-butoxide, zirconium tetrachloride, titanium tetrachloride, titanium trichloride, butoxy titanium trichloride, dibutoxy titanium dichloride, tributoxy titanium chloride, tetra-methoxy titanium, tetra-ethoxy titanium, tetra-propoxy titanium, tetra-iso-propoxy titanium, tetra-butoxy-titanium, tetra-iso-butoxy titanium, tetra-sec-butoxy titanium, tetra-tert-butoxy titanium, tetra-pentoxy titanium, tetra-phenoxy titanium, oxy-titanium diacetylacetonate, titanium acetate, titanium trisacetylacetonate, titanium oxalate, titanium tetra (dimethyl amide) and the like and combinations thereof.

Among them, compounds soluble in the mixed monomer solution, particularly, vanadium compounds are preferable. The preferred compounds include vanadyl trichloride, vanadyl diacetylacetonate, vanadium trisacetylacetonate, tri-tert-butoxy vanadyl, tri-ethoxy vanadyl, vanadium tetrachloride, vanadyl tribromide, tetra-n-butoxy titanium, tetra-iso-propoxy titanium, titanium tetrachloride, oxy-titanium diacetyl acetonate, vanadyl naphthenate, vanadyl acetate, tetra-ethoxy tantalum, tetra-n-butoxy zirconium, vanadyl oxalate, titanium acetate and combinations thereof. Most preferable compounds include vanadyl trichloride, vanadyl diacetylacetonate, vanadium trisacetylacetonate and (tri-tert-butoxy) vanadyl.

The catalytic component (b) shows an aluminum-containing component selected from the group consisting of aluminum compounds having the general formulae $AlR_2X$, $Al_2R_3X_3$ and $AlRX_2$ and a combination of two or more aluminum compounds having the general formulae $AlR_2X$, $Al_2R_3X_3$, $AlRX_2$, $AlR_3$ and $AlX_3$ wherein R represents a hydrocarbon radical selected from the group consisting of alkyl, cycloalkyl, aryl, alkaryl, aralkyl radicals having 1 to 20 carbon atoms and X represents a halogen radical selected from the group consisting of F, Cl, Br and I radicals, in the above aluminum-containing component it being preferable that a ratio (d) of the total number of the hydrocarbon radicals to the total number of halogen radicals satisfies the following requirement $$0 < d \leq 2.0 \qquad (1)$$

and R and X in the aluminum compounds constituting the component B may be same or different.

Such catalytic component (B) includes organoaluminum halides and the combinations thereof, a combination of an organoaluminum halide with an aluminum halide, a combiantion of an organoaluminum with an aluminum halide and a multi-combination combined further these combinations. It is preferable that the selection of these aluminum compounds and the ratio of these aluminum compounds to be combined are determined so as to satisfy the condition of said formula 1.

As these aluminum compounds, mention may be made of ethylaluminum dichloride, ethylaluminum dibromide ethylaluminum sesquichloride, ethylaluminum sesquibromide, diethylaluminum chloride, methylaluminum dichloride, methylaluminum sesquichloride propylaluminum dichloride, propylaluminum sesquichloride. methylaluminum dibromide, methylaluminum sesquibromide, isobutylaluminum dichloride, isobutylaluminum dibromide, isobutylaluminum sesquichloride, aluminum trichloride, aluminum tribromide, trimethylaluminum, triethylaluminum, tripropylaluminum, tri-iso-butylaluminum, dimethylaluminum chloride, dimethylaluminum bromide, diethylaluminum bromide, dipropylaluminum chloride, diisobutylaluminum chloride and the like.

The more preferable catalytic components (B) are the aluminum-containing components, wherein the ratio (d) in the above formula 1 satisfies the following requirement.

$$0.2 \leq d \leq 1.2$$

The more preferable components (B) include ethylaluminum dichloride, ethylaluminum dibromide, methylaluminum dichloride, methylaluminum sesquichloride, ethylaluminum sesquichloride, ethylaluminum sesquibromide, ethylaluminum dichloride/ethylaluminum sesquichloride, triethylaluminum/aluminum trichloride, triethylaluminum/aluminum tribomide, diethylaluminum chloride/aluminum trichloride, etc.

The components (A) and (B) according to the present invention may involve complexes obtained by complexing the component (A) and/or (B) with a suitable basic organic compound. The suitable basic organic compounds include organonitriles, $\alpha,\beta$-unsaturated carboxylic acid esters, benzoic acid esters, aryl tertiary amines, aryl alkyl tertiary amines and thiophene, for example, acrylonitrile, methacrylonitrile, acetonitrile, propionitrile, benzonitrile, methyl acrylate, ethyl acrylate, methyl methacrylate, butyl methacrylate, methyl benzoate, butyl benzoate, dimethylaniline, triphenylamine, thiophene, etc. Among them, acrylonitrile, methyl methacrylate and dimethylaniline are preferable.

The catalysts according to the present invention consist of the component (A) and the component (B) and are usually prepared at a temperature of from −100°C to 20°C, preferably −78°C to 0°C. Within this range, a lower temperature is preferable. In the preparation of the catalyst, it is preferable to mix the components (A) and (B) in the presence of the conjugated polar ethylenically unsaturated monomer. It is more preferable to mix the components (A) and (B) in a mixed liquid of a conjugated diene (a), a conjugated polar ethylenically unsaturated monomer (b) and the monomer (c).

If at least one of the components (A) and (B) is complexed by such basic organic compound, the variation of catalytic activity due to the preparation order is lowered. For example, when butadiene, acrylonitrile, and styrene are copolymerized with the catalyst prepared from the components (A) and (B) at −78°C, the catalyst prepared in the presence of acrylonitrile has a high activity, while the catalyst prepared in the absence of acrylonitrile has a low activity. However, if the component (B) complexed with the basic organic compound is used, the catalytic activity is always high regardless of the preparation order of the catalyst. When the component (B) is a combination of two or more compounds, such a component (B) may be used either by previously mixing and aging these compounds or by adding them separately. Similarly, the same result is obtained in the component (A).

The proportion of transition metal in the component (A) per 1 g-atom of aluminum in the component (B) is within the range of $1/10^5$– 2/1 g-atom, preferably $1/10^5$ – 1 g-atom, more particularly 1/200 – ⅕ g-atom.

The proportion of both the components (A) and (B) used has influence on yield and polymerization degree of the copolymer and the like. Accordingly, it is possible to select the proportion of the components depending upon the object.

A total amount of both the components (A) and (B) to be used can be selected optionally, but a total amount of metal atoms in both components (A) and (B) per 1 mole of the total fed monomer is usually within the range of $1/10^5 - \frac{1}{2}$ g-atom, preferably $1/10^4 - 1/10$ g-atom.

The order for contacting the catalyst components with the monomers may be optional but when a particular monomer, for example, isobutylene capable of readily effecting a cationic polymerization is used, the catalyst components are preferably contacted with a conjugated polar ethylenically unsaturated monomer and then with the particular monomer.

The copolymerization reaction can substantially be carried out by a bulk polymerization without the use of a solvent, and further carried out in a solvent which does not prevent the copolymerization reaction.

As such solvents, mention may be made of aromatic hydrocarbons, aliphatic hydrocarbons, alicyclic hydrocarbons, halogenated hydrocarbons, halogenated carbons and carbon disulfide, for example, terrachloroethylene, carbon tetrachloride, dichlorobenzene, chlorobenzene, chloroform, butyl chloride, trichloroethane, dichloroethane, dichloromethane, xylene, toluene, benzene cyclohexane, propane, butane, pentane, hexane, heptane, octane, ligroin, petroleum ether and other petroleum mixed solvent, and carbon disulfide and their mixtures.

A ratio of the solvent to be used based on the monomer can be selected optionally.

The polymerization temperature is within the range of $-100°C - +100°C$, preferably $-78°C - +50°C$.

The copolymerization reaction is carried out under a pressure from one determined by vapor pressure in the reaction system to 50 atm.

The copolymerization reaction must be carried out under an inert atmosphere, for example, argon or nitrogen gas.

After the completion of the polymerization reaction, the after-treatment is carried out by conventional methods to purify and recover the copolymer. These methods include alcohol precipitation, alcohol washing, alcohol-hydrochloric acid washing, hydrochloric acid-water washing, steam stripping, boiling water precipitation and the like. Furthermore, an after-treatment for the polymer obtained by a catalyst containing Lewis acid may be used. In addition, a process for separating and recovering the catalytic components by adding a compound capable of forming a complex with the catalytic component may be used.

The copolymers obtained by the method according to the present invention have various properties according to the combination of monomers, the kind, composition and amount of the catalyst, the monomer feed ratio and the other polymerization conditions, but in any case the conjugated diene unit has a high trans-1,4 -type linkage and the ratio of the total sum of the donor menomer units to that of the acceptor monomer units is always 1:1.

The linkage type of the conjugated diene unit and the composition of the resulting multi-component alternating copolymers can be analyzed by infrared absorption spectrum (abridged as IR spectrum hereinafter), elementary analysis of polymers produced under various conditions, nuclear magnetic resonance spectrum (abridged as NMR spectrum hereinafter) and the like. Namely it can be found from IR spectrum that the conjugated diene units are always bonded in a high trans-1,4 type and that all kind of monomer units are included in the copolymer and it can be found from the elementary analysis that the molar ratio of the total donor monomer units to the total acceptor monomer units is always substantially 1 : 1, even if the feed ratio of the monomers is varied. Furthermore, it can be confirmed from the chemical shift and the peak area ratio of NMR spectrum that the reaction product is not a mixture but a copolymer and further the ratio of each monomer unit, that is, the composition can be confirmed.

These specific copolymers have properties which have never seen in the previously known copolymers and they have wide applications, some of which are developed by utilizing properties which have never been provided with in the conventional copolymers. The copolymers can be used directly or may be used after converting into a substance having a three dimentional structure by means of a cross-linking agent. Namely, they can be used for various plastic materials, materials for rubbery composition, adhesives, films, compounds, latex, paints, surface treating agents, etc. of this invention and are not intended as limitations thereof.

For a better understanding of the invention, reference is taken to the accompanying drawings, wherein.

COMPARATIVE EXAMPLE

Into a glass pressure tube were charged hexane in an amount of ½ based on the total amount of monomers, then 100 mmoles of butadiene and 100 mmoles of acrylonitrile at −78°C under nitrogen atmosphere. Then, 0.08 mmole of vanadyl trichloride was added thereto and the resulting mixture was mixed thoroughly, after which 4 mmoles of ethylaluminum dichloride were added to the mixture. The reaction tube was fused and sealed, and left to stand in ice-water. After 30 minutes, the polymerization reaction was stopped, and the resulting mass was purified and dried to obtain a rubbery alternating copolymer in a yield at 16.3%. The obtained rubbery copolymer had a glass transition temperature of −14°C. Elementary analysis showed that the obtained copolymer had a composition of 49.9 mol% of acrylonitrile and 50.1 mol% of butadiene.

EXAMPLE 1

The treatment was effected in the same manner as described in the Comparative Example, except that 90 mmoles of butadiene and 90 mmoles of acrylonitrile together with 20 mmoles of n -butyl acrylate were charged, and the polymerization was effected at 0°C for 5 hours, to obtain a rubbery multi-component alternating copolymer in a yield of 3.4%. The thus obtained rubbery copolymer had a glass transition temperature of −22°C. Elementary analysis showed that the copolymer had a composition of butadiene/acrylonitrile/n-butyl acrylate = 52.8/38.6/8.6 (molar ratio).

EXAMPLE 2

The treatment was effected in the same manner as described in Example 1, except that 70 mmoles of butadiene, 70 mmoles of acrylonitrile and 60 mmoles of n-butyl acrylate were charged, and the polymerization was effected at 0°C for 69 hours, to obtain a rubbery multi-component alternating copolymer in a yield of 9.7%. The thus obtained rubbery copolymer had a glass transition temperature of −47°C. Elementary analysis showed that the copolymer had a composition of butadiene/acrylonitrile/n-butyl acrylate = 50.7/28.2/21.1 (molar ratio).

EXAMPLE 3

Into a glass pressure tube were charged 8.9 g of isoprene, 3.5 g of butadiene and 13.8 g of acrylonitrile at −78°C under nitrogen atmosphere. Then, 2 moles/l solution of ethylaluminum dichloride in toluene was added to the reaction system in an amount of 2.15 mol% of ethylaluminum dichloride based on the total amount of monomers, after which 0.1 mole/l solution of vanadyl trichloride in dichloroethane was added thereto in an amount of 0.043 mol% of vanadyl trichloride based on the total amount of monomers. After left to stand for 24 hours at 0°C, the reaction mixture was subjected to a commonly used after-treatment to obtain 10.6 g of a rubbery elastic copolymer. It was found that the thus obtained rubbery copolymer was dissolved completely in tetrahydrofuran, and the copolymer neither was a mixture of homopolymers nor a polymer having a structure similar to homopolymer, but was a perfect alternating copolymer.

Figure 1:
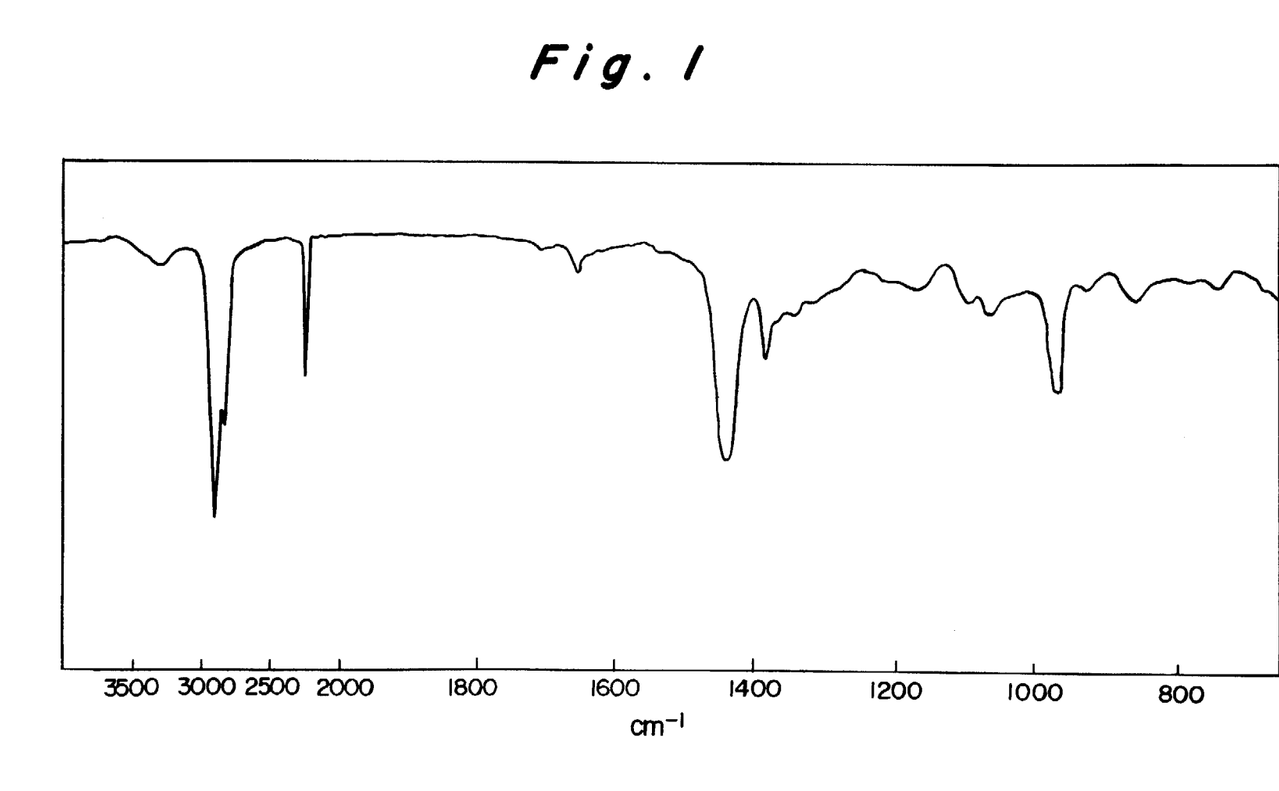
FIG. 1 is an infrared adsorption spectrum diagram of a ternary copolymer of isoprene/acrylonitrile/butadiene in the following Example 3.

FIG. 1 shows an IR spectrum of the ternary copolymer in this Example 3. From this IR spectrum and NMR spectrum, it was found that conjugated diene unit was connected in a high trans-1,4 type. The composition of the resulting copolymer determined from the ratio of peak areas of NMR spectrum was isoprene/acrylonitrile/butadiene = 44/52/4 (molar ratio), that is (isoprene + butadiene)/acrylonitrile = 48/52 (molar ratio). This composition is entirely different from an expected composition of isoprene/acrylonitrile/butadiene = 27/46/28 (molar ratio), which is calculated from the ratio of reactivities of monomers in the free radical polymerization by using the Alrfrey-Goldfinger's equation (T. Alfrey Jr., and G. Goldfinger, J. Chem. Phys. 12, 322 (1944)). The fact shows that the ternary copolymer is this Example 3 is produced in a mechanism entirely different from the commonly known mechanism of radical polymerization.

EXAMPLE 4

The treatment was effected in the same manner as described in Example 3, except that 4.2 g of butadiene, 16.2 g of acrylonitrile and 6.4 g of propylene were used, to obtain 7.3 g of a rubbery elastic copolymer. This copolymer was dissolved completely in tetrahydrofuran. From IR spectrum, it was found that in the copolymer, butadiene unit was connected in a high trans-1,4 type. From NMR spectrum, it was found that the copolymer had a composition of butadiene/acrylonitrile/propylene = 47/52/1 (molar ratio), that is, (butadiene + propylene)/acrylonitrile = 48/52 (molar ratio).

EXAMPLE 5

Tetrachloroethylene was firstly charged into a reaction vessel as a solvent in an amount of ½ based on the total amount of monomers, and the vessel was cooled to −78°C. Into the vessel were charged 8.1 g of acrylonitrile, 8.3 g of butadiene and 6.4 g of propylene in this order. Then, a complex of ethylaluminum dichloride with acrylonitrile, which had previously been prepared by aging an equimolar mixture of ethylaluminum dichloride and acrylonitrile at room temperature. was added thereto in an amount of 1.68 mol% based on the total amount of monomers, after which vanadyl trichloride was added thereto in an amount of 0.034 mol% based on the total amount of monomers. The reaction mixture was left to stand for 24 hours at 0°C to obtain 6.7 g of a rubbery elastic copolymer. From IR spectrum, it was found that in the copolymer, butadiene unit was connected in a high trans-1,4 type.

Elementary analysis showed that the copolymer contained 13.33% of nitrogen, 78.02% of carbon and 8.65% of hydrogen. It was found from these values that the copolymer had a composition of butadiene/acrylonitrile/propylene = 40/49/11 (molar ratio), that is, (butadiene + propylene)/acrylonitrile = 51/49 (molar ratio). The intrinsic viscosity of the copolymer measured at 30°C in dimethylformamide was 1.30.

Furthermore, when (tributoxy)vanadyl, titanium tetrachloride, tetra-isopropoxy titanium, vanadium trisacetylacetonate, vanadium octenate, zirconium tetrabutoxide or tantalum pentaethoxide was used instead of vanadyl trichloride, and/or when methyl methacrylate, acetonitrile or dimethylaniline was used instead of acrylonitrile as a basic compound to be used for producing complexes, the same ternary copolymer was also obtained.

EXAMPLE 6

Figure 2:
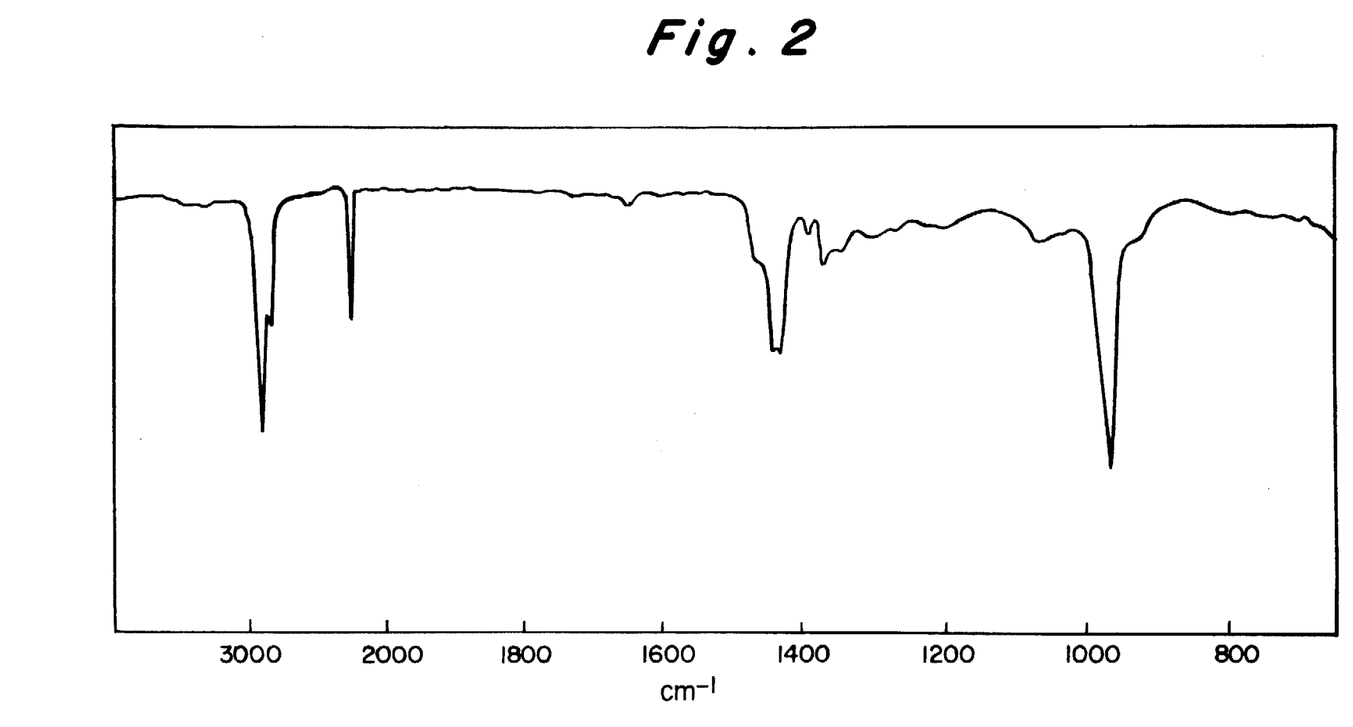
FIG. 2 is that of a ternary copolymer of butadiene/acrylonitrile/isobutylene in the following Example 6.

The treatment was effected in the same manner as described in Example 3, except that 3.1 g of butadiene, 12.2 g of acrylonitrile, 6.7 g of isobutylene, 2.13 mol% of ethylaluminum dichloride based on the total amount of monomers and 0.057 mol% of vanadyl trichloride based on the total amount of monomers were charged, and the polymerization was effected at 0°C for 24 hours, to obtain 4.9 g of a robbery elastic copolymer. The copolymer was dissolved completely in tetrahydrofuran. Elementary analysis showed that the copolymer contained 13.66% of nitrogen, 77.16% of carbon and 8.75% of hydrogen. It was found from these values that the copolymer had a composition of butadiene/acrylonitrile/isobutylene = 30/53/17 (molar ratio), that is, (butadiene + isobutylene)/acrylonitrile = 47/53 (molar ratio). On the other hand, in an ordinary radical polymerization, such a composition is expected from calculation by using the Alfrey-Goldfinger's equation that molar ratio of butadiene/acrylonitrile/isobutylene is 33/36/31. Therefore, it was found that the above mentioned ternary copolymer was produced in a mechanism entirely different from that of ordinary radical polymerization. FIG. 2 shows an IR spectrum of the ternary copolymer in this Example 6. From this IR spectrum, it was found that in the ternary copolymer, 3 monomer units were contained and butadiene unit was connected in a high trans-1,4 type. The intrinsic viscosity of the ternary copolymer measured at 30°C in dimethylformamide was 1.11.

Furthermore, when an equimolar mixture of triethylaluminum and aluminum trichloride, an equimolar mixture of diethylaluminum chloride and aluminum trichloride, a mixture of 1 mole of triethylaluminum and 4 moles of ethylaluminum dichloride, or an equimolar mixture of ethylaluminum dichloride and aluminum trichloride was used instead of ethylaluminum dichloride, the same ternary copolymer was also obtained.

EXAMPLE 7

The treatment was effected in the same manner as described in Example 5, except that 6.2 g of butadiene, 6.1 g of acrylonitrile, 6.7 g of isobutylene, 1.68 mol% of a complex of ethylaluminum dichloride with acrylonitrile (the same complex as used in Example 5) based on the total amount of monomers, and 0.034 mol% of vanadyl diaceylacetonate based on the total amount of monomers were charged, to obtain 5.4 g of a rubbery elastic copolymer. Elementary analysis showed that the copolymer contained 13.50% of nitrogen, 77.90% of carbon and 8.60% of hydrogen. It was found from these values that the copolymer had a composition of butadiene/acrylonitrile/isobutylene = 41/52/7 (molar ratio), that is, (butadiene + isobutylene)/acrylonitrile = 48/52 (molar ratio). This composition was entirely different from the expected composition of butadiene/acrylonitrile/isobutylene = 33/34/33 (molar ratio) in an ordinary radical polymerization. From IR spectrum and NMR spectrum, it was found that in the copolymer, 3 monomer units were copolymerized and butadiene unit was connected in a high trans-1,4 type.

EXAMPLE 8

The treatment was effected in the same manner as described in Example 6, except that 7.0 g of butadiene, 34.5 g of acrylonitrile, 13.5 g of styrene, 1.43 mol% of ethylaluminum dichloride based on the total amount of monomers and 0.029 mol% of vanadyl trichloride based on the total amount of monomers were charged in this order, to obtain 8.62 g of an elastic resinous copolymer. This resinous copolymer was dissolved completely in tetrahydrofuran. Elementary analysis showed that the copolymer contained 11.23% of nitrogen, 79.75% of carbon and 8.23% of hydrogen. It was found from these values that the copolymer had a composition of butadiene/acrylonitrile/styrene = 44/47/9 (molar ratio), that is, (butadiene + styrene)/acrylonitrile = 53/47 (molar ratio).

On the other hand, in an ordinary radical polymerization, the expected composition is butadiene/acrylonitrile/styrene = 27/48/25 (molar ratio). Therefore, it was found that the resinous copolymer was produced in a mechanism entirely different from that of ordinary radical polymerization. From IR spectrum, it was found that in the resinous copolymer, 3 monomer units were contained and butadiene unit was connected in a high trans-1,4 type.

EXAMPLE 9

The treatment was effected in the same manner as described in Example 7, except that 7.0 g of butadiene, 6.9 g of acrylonitrile, 13.5 g of styrene, 1.67 mol% of a complex of ethylaluminum dichloride with acrylonitrile (the same complex as used in Example 5) based on the total amount of monomers, and 0.033 mol% of vanadyl trichloride based on the total amount of monomers were charged in this order, to obtain 4.03 g of an elastic resinous copolymer. This copolymer was dissolved completely in limethylformamide. Elementary analysis showed that the copolymer contained 11.37% of nitrogen, 80.40% of carbon, 8.13% of hydrogen. It was found from these values that the copolymer had a composition of butadiene/acrylonitrile/styrene = 41/48/11 (molar ratio), that is, (butadiene + styrene)/acrylonitrile = 52/48 (molar ratio). On the other hand, in an ordinary radical polymerization, the expected composition is butadiene/acrylonitrile/styrene = 35/38/28 (molar ratio). Therefore, it was found that the resinous copolymer was produced in a mechanism entirely different from that of ordinary radical polymerization. From IR spectrum, it was found that in the resinous copolymer, 3 monomer units were contained and butadiene unit was connected in a high trans-1,4 type.

EXAMPLE 10

The treatment was effected in the same manner as described in Example 7, except that 7.0 g of butadiene, 13.0 g of methyl methacrylate, 13.5 g of styrene, 1.66 mol% of a complex of ethylaluminum dichloride with acrylonitrile based on the total amount of monomers and 0.033 mol% of vanadyl trichloride based on the total amount of monomers were charged in this order, and the reaction mixture was left to stand for 48 hours at 25°C and copolymerized, to obtain 3.14 g of an elastic resinous copolymer. The resinous copolymer was dissolved completely in dimethylformamide. From IR spectrum, it was found that in the copolymer, 3 monomer units were contained and butadiene unit was connected in a high trans-1,4 type. Elementary analysis showed that the copolymer contained 18.00% of oxygen, 73.29% of carbon and 8.71% of hydrogen. It was found from these values that the copolymer had a composition of butadiene/methyl methacrylate/styrene = 36/47/17 (molar ratio), that is, (butadiene + styrene)/methyl methacrylate = 53/47 (molar ratio). On the other hand, in an ordinary radical polymerization, the expected composition is butadiene/methyl methacrylate/styrene = 49/34/17 (molar ratio). Therefore, it was found that the resinous copolymer was produced in a mechanism entirely different from that of ordinary radical polymerization.

EXAMPLE 11

Figure 3:
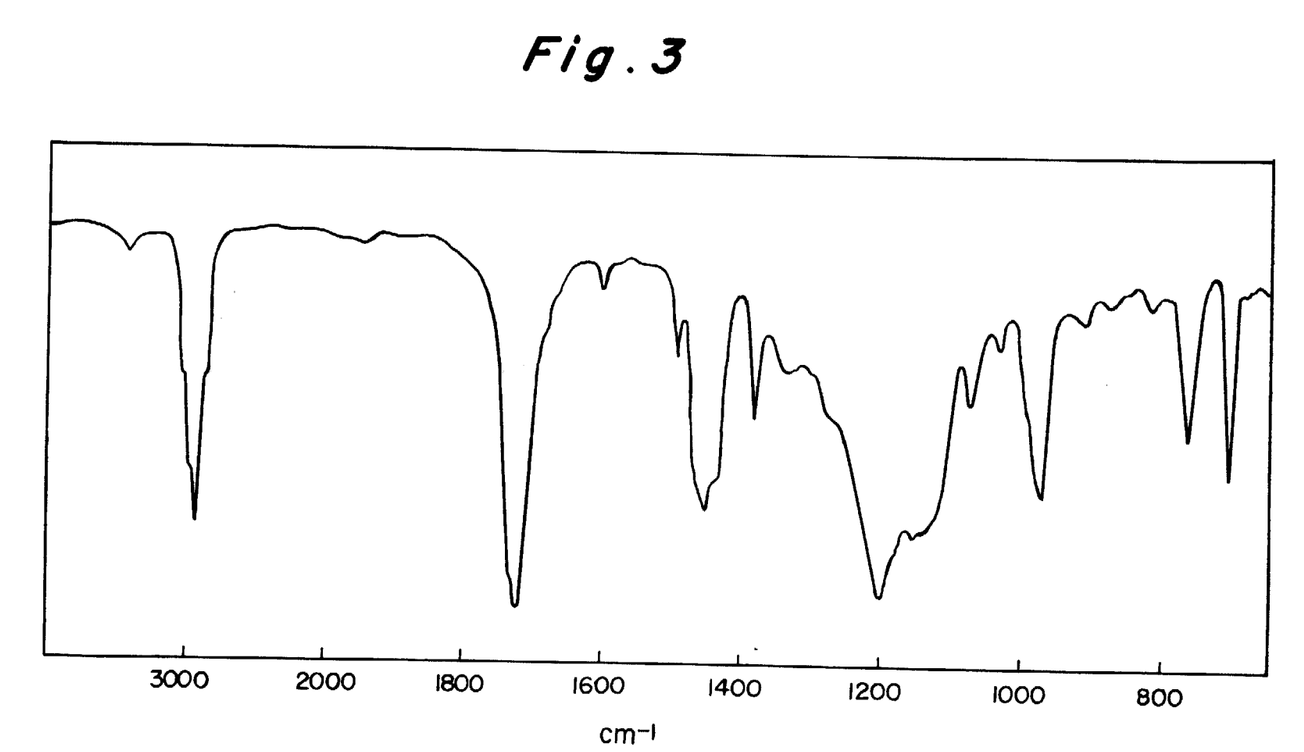
FIG. 3 is that of a ternary copolymer of butadiene/methyl methacrylate/styrene in the following Example 11.

The treatment was effected in the same manner as described in Example 8, except that 14.0 g of butadiene, 6.5 g of methyl methacrylate, 13.5 g of styrene, 1.43 mol% of ethylaluminum dichloride based on the total amount of monomers and 0.029 mol% of vanadyl trichloride based on the total amount of monomers were charged in this order, and the reaction mixture was left to stand for 48 hours at 0°C and copolymerized, to obtain 4.6 g of an elastic resinous copolymer. This resinous copolymer was dissolved completely in tetrahydrofuran. Elementary analysis showed that the copolymer contained 19.85% of oxygen, 72.44% of carbon and 8.85% of hydrogen. It was found from these values that the copolymer had a composition of butadiene/methyl methacrylate/styrene = 40/49/12 (molar ratio), that is, (butadiene + styrene)/methyl methacrylate = 52/49 (molar ratio). On the other hand, in an ordinary radical polymerization, the expected composition is butadiene/methyl methacrylate/styrene = 64/19/16 (molar ratio). Therefore, it was found that the resinous copolymer was produced in a mechanism entirely different from that of radical polymerization. FIG. 3 shows an IR spectrum of the ternary copolymer in this Example 11. From this IR spectrum, it was found that in this ternary copolymer, butadiene unit was connected in a high trans-1,4 type, and 3 monomer units were contained. The intrinsic viscosity of the copolymer measured at 30°C in toluene was 1.25.

EXAMPLE 12

The treatment was effected in the same manner as described in Example 10, except that 14.0 g of butadiene, 6.5 g of methyl methacrylate, 3.5 g of acrylonitrile, 1.66 mol% of a complex of ethylaluminum dichloride with acrylonitrile based on the total amount of monomers and 0.033 mol% of vanadyl trichloride based on the total amount of monomers were charged in this order, and the reaction mixture was left to stand for 24 hours at 25°C and copolymerized, to obtain 3.7 g of a rubbery elastic copolymer. This rubbery copolymer was dissolved completely in tetrahydrofuran.

Figure 4:
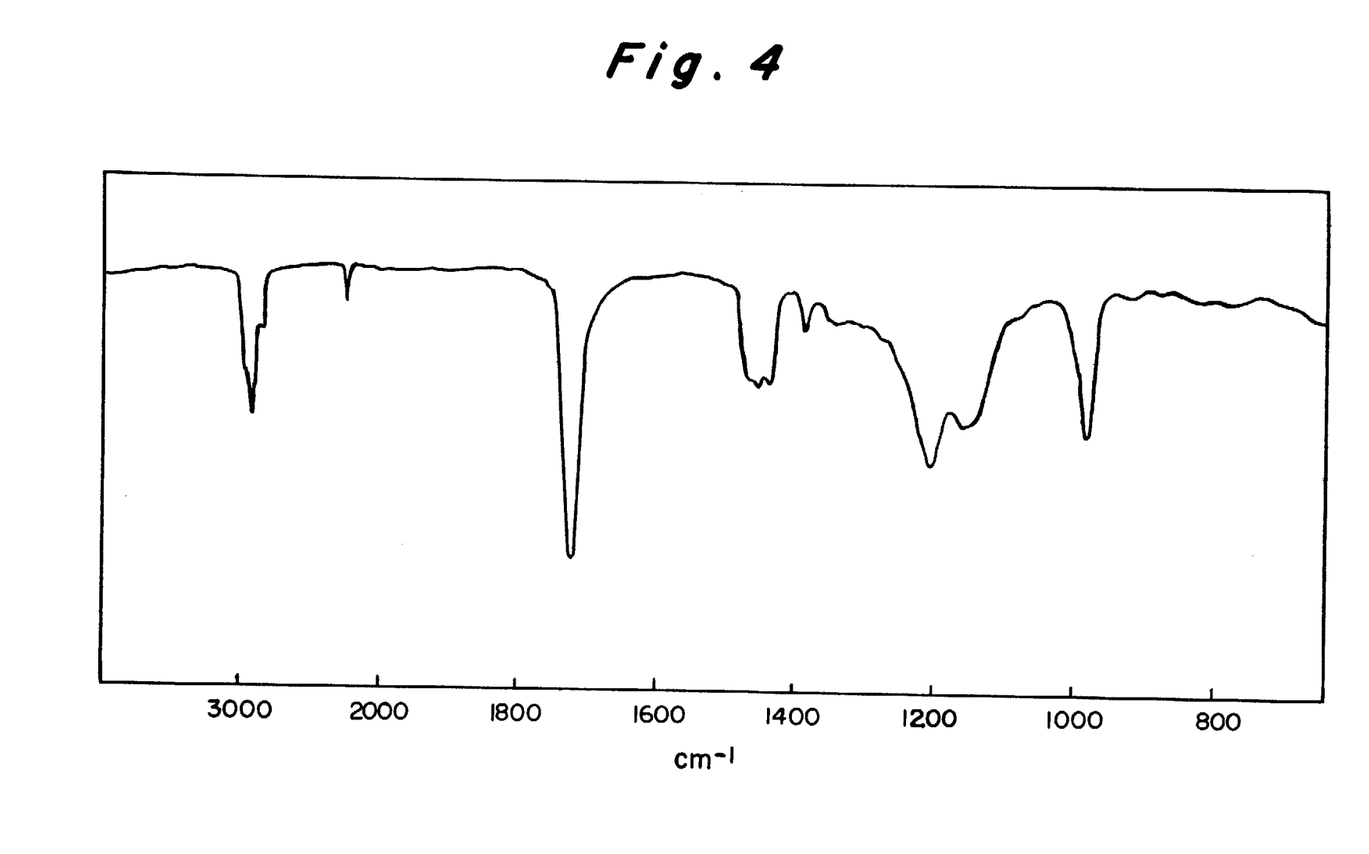
FIG. 4 is that of a ternary copolymer of butadiene/methyl methacrulate/acrylonitrile in the following Example 12.

FIG. 4 shows an IR spectrum of the ternary copolymer in this Example 12. From this IR spectrum, it was found that in the ternary copolymer, 3 monomer units were contained and butadiene unit was connected in a high trans-1,4 type. Elementary analysis showed that the ternary copolymer contained 17.22% of oxygen, 2.23% of nitrogen, 71.23% of carbon and 9.15% of hydrogen. It was found from these values that the ternary copolymer had a composition of butadiene/methyl methacrylate/acrylonitrile = 49/39/12 (molar ratio), that is, butadiene/(methyl methacrylate + acrylonitrile) = 49/51 (molar ratio).

Furthermore, the above mentioned composition was confirmed by NMR spectrum. That is, the ratio of butadiene/methyl methacrylate in the copolymer, which was calculated from the ratio of the area of resonance spectrum of methin proton in butadiene unit at $\tau = 4.6$ to that of methoxy proton in methyl methacrylate unit at $\tau = 6.36$, agreed with the ratio calculated from the above mentioned elementary analysis values.

On the other hand, in an ordinary radical polymerization, the expected composition is butadiene/methyl methacrylate/acrylonitrile = 63/13/24 (molar ratio). Therefore, it was found that the above mentioned ternary copolymer was produced in a mechanism entirely different from that of ordinary radical polymerization and had a composition entirely different from that of conventional ternary copolymers.

The intrinsic viscosity of the ternary copolymer in this Example 12 measured at 30°C in dimethylformamide was 1.0.

Furthermore, when a complex of ethylaluminum sesquichloride with acrylonitrile or a mixture of 1 mole of triethylaluminum and 2 moles of aluminum tribromide was used instead of the complex of ethylaluminum dichloride with acrylonitrile and/or when carbon tetrachloride, toluene, hexane or carbon disulfide was used as solvent, the same copolymer was obtained.

EXAMPLE 13

Into a glass ampoule were charged 2.0 mol% of aluminum trichloride based on the total amount of monomers, 8.1 g of acrylonitrile, 8.3 g of butadiene, 5.3 g of methyl methacrylate and 6.5 g of isobutylene in this order at −78°C under nitrogen atmosphere. Then, 0.05 mol% of titanium tetrachloride based on the total amount of monomers, and further 1.0 mol% of trimethylaluminum based on the total amount of monomers were added thereto. The reaction mixture was left to stand for 24 hours at 0°C to obtain 4.3 g of a rubbery elastic copolymer. From IR spectrum and NMR spectrum, it was found that in the rubbery copolymer, all the monomer units were contained and butadiene unit was connected in a high trans-1,4 type. From NMR spectrum and elementary analysis values of oxygen, nitrogen, carbon and hydrogen, it was found that the obtained copolymer had a composition of (butadiene + isoprene)/(methyl methacrylate + acrylonitrile) = 48/52 (molar ratio).

EXAMPLE 14

The treatment was effected in the same manner as described in Example 13, except that 1.6 mol% of aluminum tribromide based on the total amount of monomers, 7.7 g of methyl methacrylate, 5.4 g of isoprene, 2.5 g of styrene and 0.6 mol% of triethylaluminum based on the total amount of monomers were charged in this order, and the polymerization was effected at 20°C for 24 hours, to obtain 3.2 g of a resinous copolymer. From IR spectrum, NMR spectrum and elementary analysis values, it was found that the resinous copolymer had a composition of (isoprene + styrene)/methyl methacrylate = 52/48 (molar ratio).

What is claimed is:

1. A method of producing multi-component alternating copolymers having a ratio of the total moles of donor monomer units selected from the group consisting of conjugated dienes, aryl-substituted ethylenically unsaturated hydrocarbons and isobutylene to the total moles of acceptor monomer units selected from the group consisting of acrylonitrile, methacrylonitrile and esters of $\alpha,\beta$-unsaturated monocarboxylic acids being 1:1, said donor monomer units and said acceptor monomer units being bonded alternately, which comprises
copolymerizing a monomer (a) selected from the group consisting of conjugated dienes having 4 to 10 carbon atoms,
a conjugated polar ethylenically unsaturated monomer (b) selected from the group consisting of acrylonitrile, methacrylonitrile and esters of $\alpha,\beta$-unsaturated monocarboxylic acids, and
at least one monomer (c) selected from the group consisting of acrylonitrile, methacrylonitrile, esters of $\alpha,\beta$-unsaturated monocarboxylic acids, conjugated dienes, arylsubstituted ethlenically unsaturated hydrocarbons and isobutylene, said monomer (c) being different from the monomers (a) and (b),
at a temperature of −100°C to 100°C in a non-aqueous liquid medium,
under an inert gas
at a pressure from one determined by vapor pressure in the reaction system to 50 atm
in the presence of a catalyst prepared from
a component (A): at least one transistion metal compound selected from compounds of vanadium and titanium and
a component (B): an aluminum-containing component selected from the group consisting of aluminum compounds having the general formulae:

and a combination of two or more aluminum compounds having the general formulae wherein R represents a hydrocarbon radical selected from the group consisting of alkyl, cycloalkyl, aryl, alkaryl, and aralkyl radicals having 1 to 20 carbon atoms, and X represents a halogen radical selected from the group consisting of F, Cl, Br and I radicals, in which said component (B) the ratio (d) of the total number of the hydrocarbon radicals to the total number of halogen radicals satisfied the requirement that $$O < d \leq 2.0 \qquad (1)$$

and R and X in the aluminum compounds constituting said component (B) may be the same or different, said catalyst being prepared after complexing at least one of the components (A) and (B) with a basic organic compound selected from the group consisting of organic nitriles, $\alpha,\beta$-unsaturated carboxylic acid esters, benzoic acid esters, aryl tertiary amines, aryl alkyl tertiary amines and thiophene, the amount of said basic organic compound being 1.0 – 1.125 mol based upon component (A) or (B), the transitiion metal atom in said component (A) being present in an amount of $1/10^6$ to 2 g-atom based upon 1 g-atom of Al in said component (B), the total amount of metal atoms in the components (A) and (B) being $1/10^5$ to 1/2 g-atom based upon 1 mole of the fed monomers.

2. The method as claimed in claim 1, wherein said basic organic compound is a conjugated polar ethylenically unsaturated monomer to be used for the copolymerization.

3. The method as claimed in claim 1, wherein the ratio (d) of the total number of the hydrocarbon radicals to the total number of halogen radicals in the component (B) satisfies the following requirement:

$$0.2 < d \leq 1.2.$$

4. The method as claimed in claim 1, wherein the component (A) is vanadium compound.

5. The method as claimed in claim 1, wherein the component (A) is titanium compound.

6. The method as claimed in claim 1, wherein the component (A) is vanadyl trichloride.

7. The method as claimed in claim 1, wherein the component (A) is vanadyl diacetylacetonate.

8. The method as claimed in claim 1, wherein the component (B) has the general formula AlRCl$_2$, wherein R is an alkyl radical having 1 to 4 carbon atoms.

9. The method as claimed in claim 1, wherein the component (B) is ethylaluminum dichloride.

10. The method as claimed in claim 1, wherein the component (B) is a combination of trimethylaluminum and aluminum trichloride.

11. The method as claimed in claim 1, wherein the component (B) is a combination of triethylaluminum and aluminum tribromide.

12. The method as claimed in claim 1, wherein the catalyst system is vanadyl trichloride and ethylaluminum dichloride.

13. The method as claimed in claim 1, wherein the catalyst system is titanium tetrachloride and a combination of trimethylaluminum and aluminum trichloride.

14. The method as claimed in claim 1, wherein the catalyst system is titanium tetrachloride and a combination of triethylaluminum and aluminum tribromide.

15. The method as claimed in claim 1, wherein the catalyst system is vanadyl diacetylacetonate and ethylaluminum dichloride.

16. The method as claimed in claim 1, wherein the multi-component copolymerization is effected substantially in the absence of solvent.

17. The method as claimed in claim 1, wherein butadiene, acrylonitrile, and n-butyl acrylate are copolymerized.

18. The method as claimed in claim 1, wherein isoprene, butadiene, and acrylonitrile are copolymerized.

19. The method as claimed in claim 1, wherein butadiene, acrylonitrile, and isobutylene are copolymerized.

20. The method as claimed in claim 1, wherein butadiene, acrylonitrile, and styrene are copolymerized.

21. The method as claimed in claim 1, wherein the multi-component copolymerization is effected in n-hexane as a solvent.

22. The method as claimed in claim 1, wherein the multi-component copolymerization is effected in tetrachloroethylene as a solvent.

* * * * *